(12) United States Patent
Guy

(10) Patent No.: US 6,564,796 B1
(45) Date of Patent: May 20, 2003

(54) THERMAL PANEL FOR PASSIVE TEMPERATURE CONTROL

(75) Inventor: James Kevan Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/092,044

(22) Filed: Mar. 6, 2002

(51) Int. Cl.[7] ............................. F24J 2/00; F28F 27/00
(52) U.S. Cl. .................. 126/701; 126/589; 126/648; 165/96; 165/276; 359/358
(58) Field of Search ..................... 126/589, 648–650, 126/599, 701, 709, 704, 705; 165/96, 96 WV, 276, 277; 236/78 R, 68 B, 99 D, 101 R; 359/358, 359; 52/171.3, 1

(56) References Cited

U.S. PATENT DOCUMENTS

| | | | | |
|---|---|---|---|---|
| 3,965,887 A | | 6/1976 | Gramer et al. | |
| 4,085,999 A | * | 4/1978 | Chahroudi | 359/359 |
| 4,423,398 A | | 12/1983 | Jachowski et al. | |
| 4,446,850 A | * | 5/1984 | Zilisch | 52/171.3 |
| 5,128,181 A | * | 7/1992 | Kunert | 126/701 |
| 5,813,454 A | * | 9/1998 | Potter | 165/276 |
| 6,145,752 A | | 11/2000 | Jackson | |

* cited by examiner

Primary Examiner—James C. Yeung
(74) Attorney, Agent, or Firm—Artz & Artz, PC

(57) ABSTRACT

A thermal panel (10) for passive temperature control includes a cell (28) having a transparent side (14) and a base side (24). The cell (28) has a heatable plate (12) contained therein. The heatable plate (12) is passively disposable between a warming position and a cooling position. The heatable plate (12) is heated by a plurality of light waves (34) when the plate (12) is passively disposed in the warming position. Further, the cell also has an insulating medium (30) contained therein. The insulating medium (30) shields the heatable plate (12) from the light waves (34) when the heatable plate (12) is in the cooling position.

20 Claims, 4 Drawing Sheets

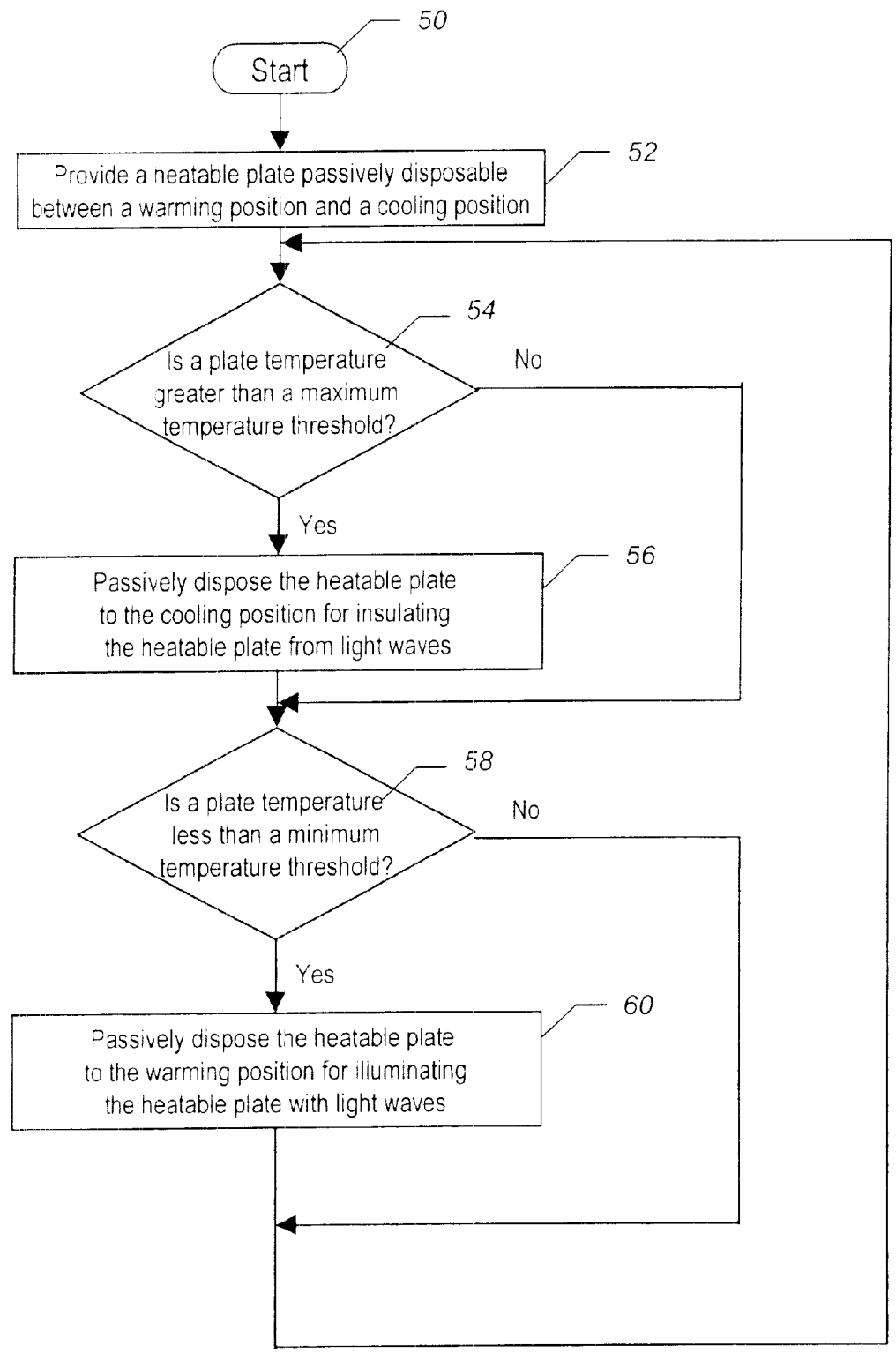

THERMAL PANEL FOR PASSIVE TEMPERATURE CONTROL

TECHNICAL FIELD

The present invention relates generally to thermal panels, and more particularly, to thermal panels used for passively regulating temperature within a predetermined range.

BACKGROUND OF THE INVENTION

Passive temperature control systems are used to either passively absorb or passively reflect the energy of light waves. A typical passive temperature control system uses the absorbed energy from the light waves to produce heat.

As is known in the art, an object may absorb the energy from light waves if the frequency of the light waves is approximately equal to the vibration frequency of the electrons within the object. If the frequencies are equal, the light waves excite the electrons thereby causing them to vibrate. The vibration of the electrons subsequently transfers energy to the nuclei of the atoms and causes them to vibrate. Consequently, the atoms tend to speed up and collide with each other more frequently. The increased collisions between the atoms result in an increase in temperature of the object.

Further, it is also well known that a black coloring permits the absorption of a significant amount of light waves for producing the most heat among most of the colors. Electrons in black-colored objects absorb the most light waves because electrons therein are excited by the greatest number of light wave frequencies. On the other hand, it is also known in the art that a white coloring reflects a significant amount of light waves thereby serving as one of the most efficient colors for preventing an object from being heated by light waves.

A typical passive temperature control system employs a paint scheme for regulating a temperature of an object coupled thereto. In general, a common paint scheme remains a constant color regardless of the temperature of the object. Therefore, the paint scheme may serve as a constant absorber or a constant reflector of light waves.

In this regard, a paint scheme used only for absorbing the energy of light waves may perpetually generate heat within an object as long as the paint scheme is exposed to the light-emitting source. For example, a black-colored roof of a building may be heated by exposure to the sun regardless of whether the additional heat is desired. The additional heat may be beneficial during a cold winter season yet is usually unwelcome during a hot summer season.

Conversely, a reflective paint scheme perpetually shields an object from the energy of the light waves. For instance, a roof coated with a low solar absorption (LSA) paint is minimally heated by exposure to the sun. The heat-shielding effect may be desirable during a hot summer season yet is typically disadvantageous during a cold winter season.

It is, therefore, desirable to provide a passive temperature control system that can both absorb and reflect thermal radiation for regulating temperature to a desired temperature range.

SUMMARY OF THE INVENTION

An object of the present invention is to passively absorb the energy of light waves from a light emitting source and generate heat until a maximum threshold temperature has been reached. Another object of the present invention is to passively reflect light waves emitted from the light emitting source and prevent the generation of heat until a minimum threshold temperature has been reached.

In accordance with the above and other objects of the present invention, there is provided a thermal panel for passively controlling temperature. The thermal panel includes a cell having a transparent side and a base side. The cell has a heatable plate contained therein. The heatable plate is passively disposable between a warming position and a cooling position. The plate is passively disposed in the warming position when a plate temperature falls below a minimum temperature threshold. In the warming position, the heatable plate receives a plurality of light waves for producing heat. Further, the plate is passively disposed in the cooling position when the plate temperature rises above a maximum plate temperature. In the cooling position, an insulating medium contained within the cell prevents the light waves from illuminating the heatable plate.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

For a more complete understanding of the present invention, reference should now be had to the embodiments illustrated in greater detail in the accompanying drawings and described below by way of examples of the invention. In the drawings:

FIG. 5 is flowchart representing a method for passive temperature control according to a preferred embodiment of the present invention.

BEST MODES FOR CARRYING OUT THE INVENTION

Figure 1A:
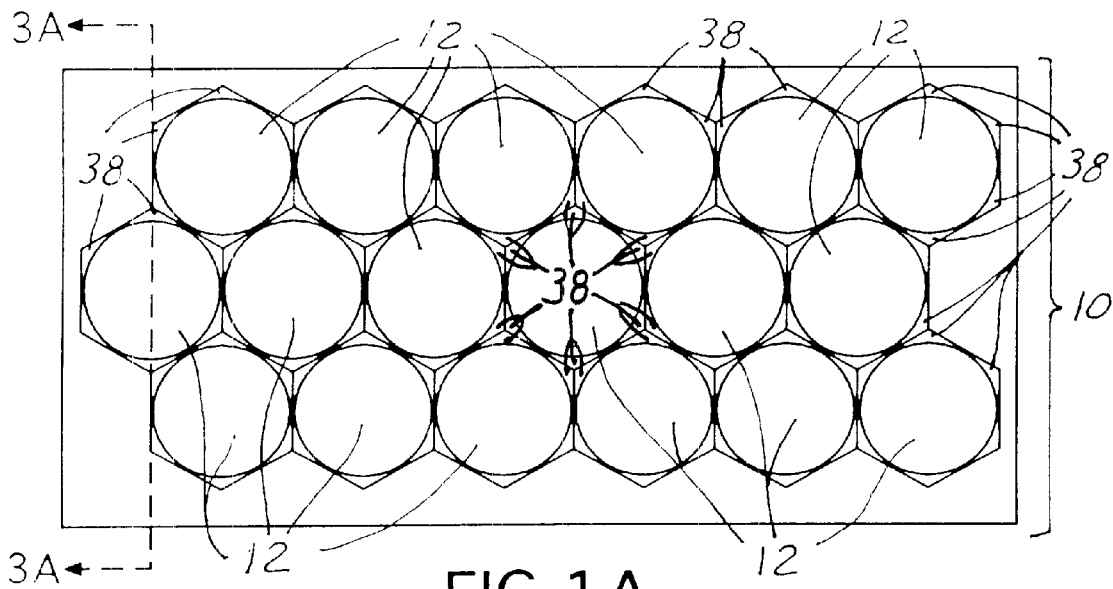
FIG. 1A is planar view of a thermal panel in a warming configuration according to a preferred embodiment of the present invention.

In the following figures, the same reference numerals are used to identify the same components in the various views.

Figure 1B:
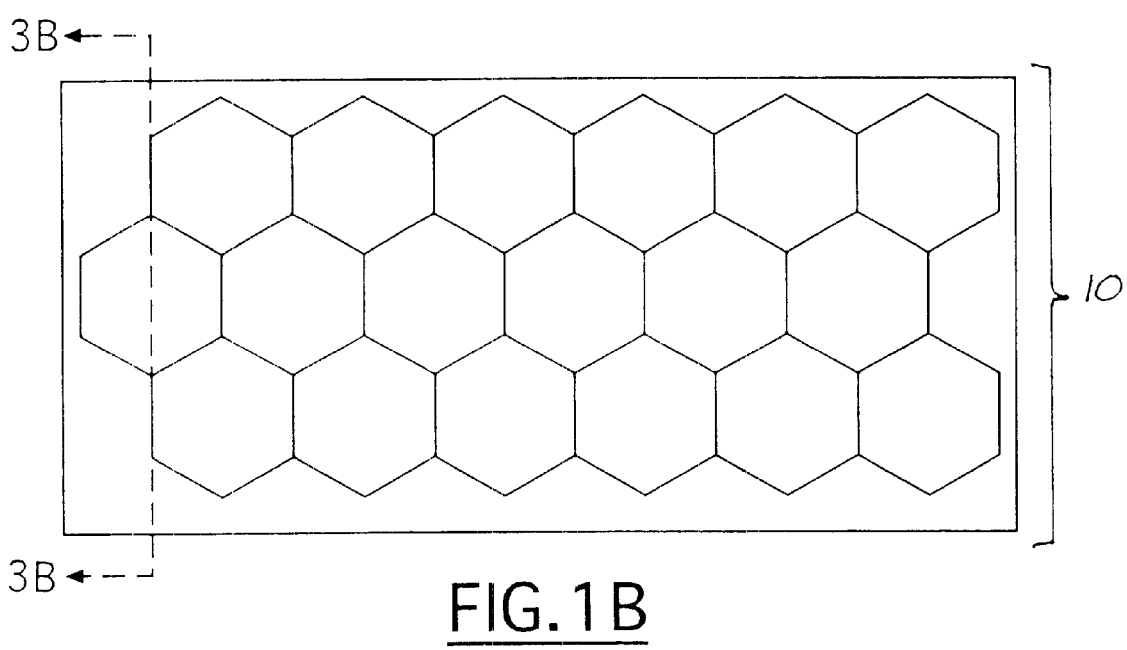
FIG. 1B is planar view of a thermal panel in a cooling configuration according to a preferred embodiment of the present invention.

Referring now to FIGS. 1A and 1B, there are generally illustrated planar views of a thermal panel 10. FIG. 1A shows the thermal panel 10 in a warming configuration wherein a series of heatable plates 12 are passively disposed in a warming position. FIG. 1B shows the thermal panel 10 in a cooling configuration wherein the series of heatable plates 12 are passively disposed in a cooling position.

Figure 2:
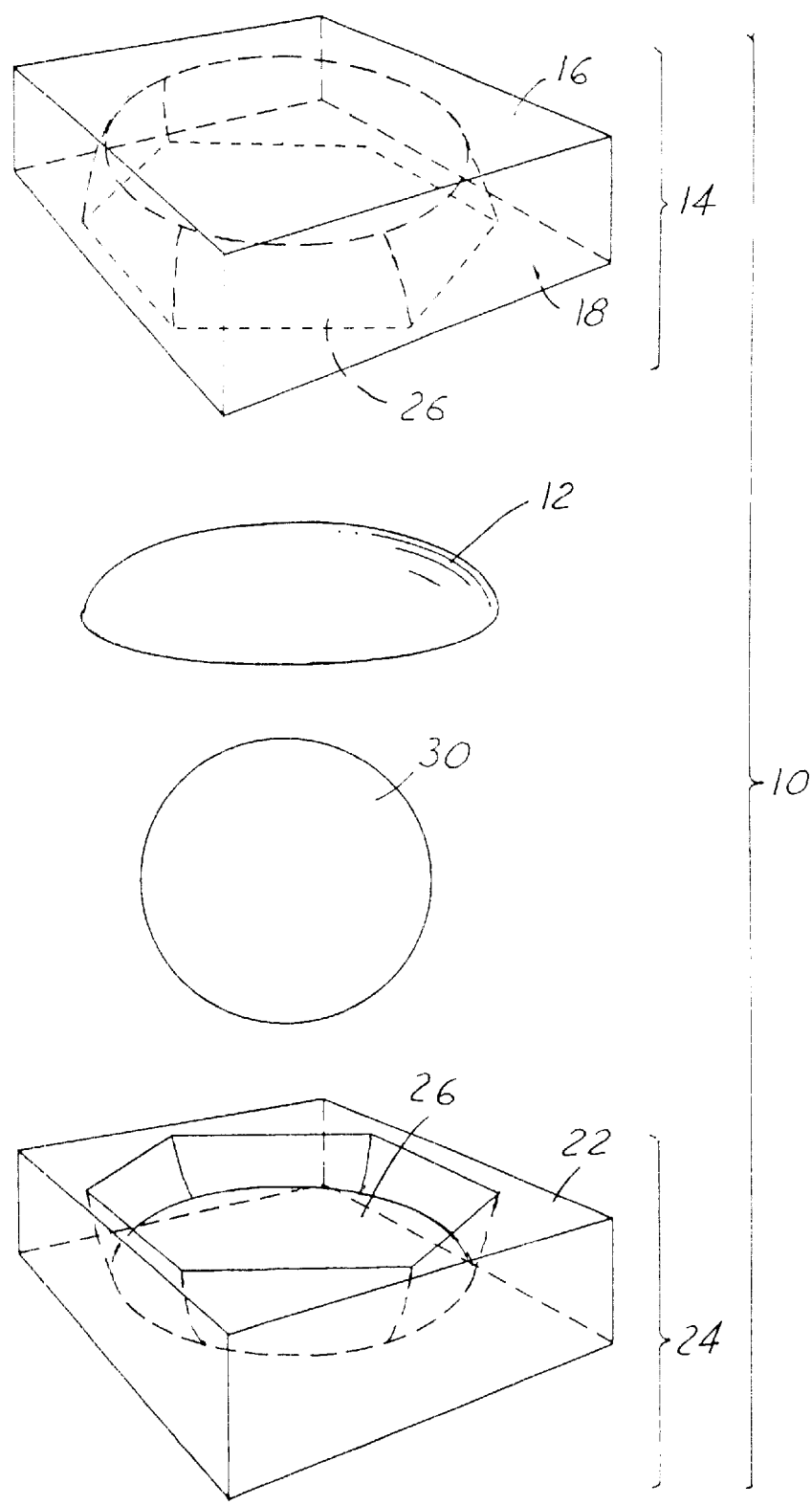
FIG. 2 is an exploded partial cutaway view of a thermal panel according to a preferred embodiment of the present invention.

Referring to FIG. 2, there is illustrated an exploded partial cutaway view of a thermal panel 10 according to a preferred embodiment of the present invention.

Figure 3A:
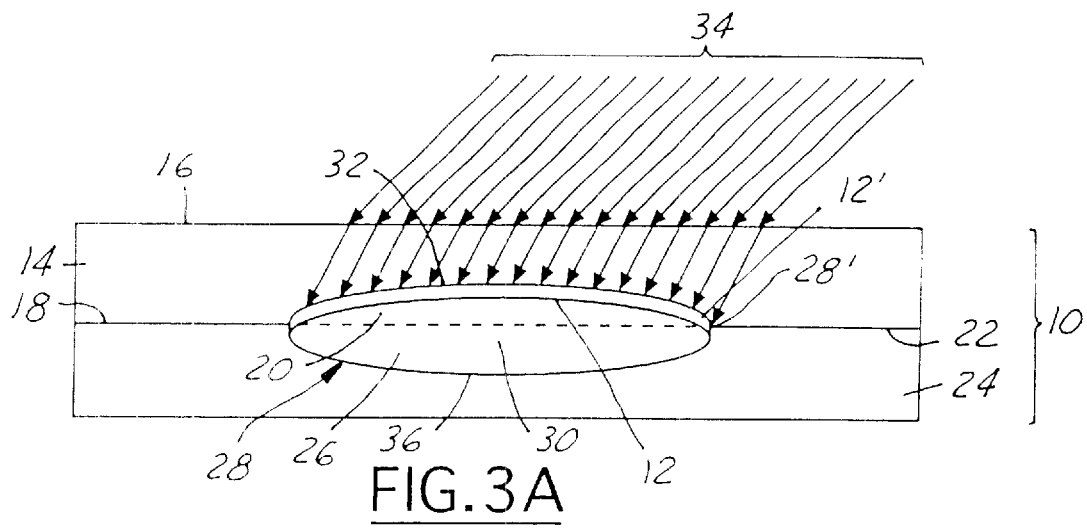
FIG. 3A is a cross-sectional view of the thermal panel in FIG. 1A, taken along line 3A—3A.
Figure 3B:
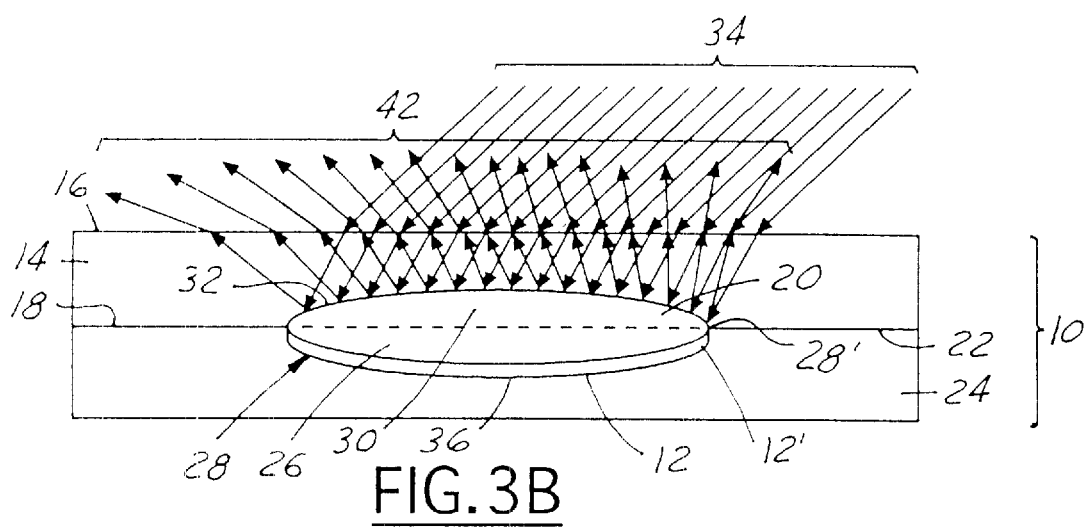
FIG. 3B is a cross-sectional view of the thermal panel in FIG. 1B, taken along line 3B—3B.

The thermal panel 10 includes a transparent pane 14 having a first surface 16 and a second surface 18. The second surface 18 has at least one warming recess 20 integrally formed therein. The warming recess 20 is defined by a transparent surface area 32 (as best shown in FIGS. 3A and 3B) which preferably is concave in shape. While only one recess 20 is shown in FIG. 2, it is understood that any number of warming recesses 20 may be included. Where a plurality of warming recesses 20 are employed, the recesses 20 are preferably arranged in a staggered hexagonal pattern in order to most efficiently use the space within the transparent pane 14.

The second surface 18 of the transparent pane 14 is fixedly coupled to a mating surface 22 of a base pane 24. The base pane 24 has a similar configuration as the transparent pane 14 in that the mating surface 22 of the base pane 24 has at least one cooling recess 26 integrally formed therein. The cooling recess 26 is defined by a base surface area 36 (as best shown in FIGS. 3A and 3B) which preferably is concave in shape. While only one recess 26 is shown in FIG. 2, it is understood that any number of recesses 26 may be included. Each cooling recess 26 in the base pane 24 is aligned with each warming recess 20 in the transparent pane 14 so as to form at least one cell 28 (best shown in FIGS. 3A and 3B).

The preferred type of material constituting the transparent pane 14 and the base pane 24 primarily depends upon the environment in which the thermal panel 10 is used. By way of illustration, a thermal panel 10 integrated within a satellite is more likely to require greater durability than a thermal panel 10 used for a blanket or tarp.

A thermal panel 10 intended for more rigorous applications could require a rigid material constituting the transparent pane 14 and the base pane 24. For instance, each pane 14, 24 may be composed of fiberglass material machined or molded in such a manner that recesses 20, 26 are formed in a hexagonal pattern. Of course, glass, plastic, and a variety of other suitable rigid materials may be employed as desired.

Alternatively, a thermal panel 10 intended for less rigorous applications could require a flexible material constituting the transparent pane 14 and the base pane 24. For example, each pane 14, 24 may be composed of an elastomer material molded in such a manner that recesses 20, 26 are formed in a hexagonal pattern therein. Another example requiring flexibility involves two sheets of mylar defining the panes 14, 24. Items intended to be contained within cells 28 are placed between the mylar sheets and then vacuum sealed therebetween. One skilled in the art will understand that a variety of other suitable materials may be used to constitute the panes 14, 24.

Thus, the thermal panel 10 may be used to passively control a temperature of various target objects. Naturally, the thermal panel 10 may be used for various other applications than the ones described above.

Each cell 28 has an insulating medium 30 and a heatable plate 12 contained therein. In general, the arrangement of the insulating medium 30 and the heatable plate 12 within the cell 28 determines whether heat is generated within the plate 12. The cell 28 and the heatable plate 12 are discussed in greater detail in the descriptions for FIGS. 3A and 3B.

Turning now to FIG. 3A, there is illustrated a cross-sectional view of the thermal panel 10 shown in FIG. 1A, taken along line 3A—3A. FIG. 3A illustrates a cell 28 containing a heatable plate 12 in the warming position. The warming position requires the heatable plate 12 to be disposed within the warming recess 20 of the transparent pane 14. Preferably, the heatable plate 12 is disposed within the warming recess 20 at a sufficient depth so as to be mated with the transparent surface area 32.

In the warming position, the light waves 34 are transmitted through the transparent pane 14 to the heatable plate 12. As is known in the art, the electrons of a transparent material do not capture the energy of a light wave 34 if the frequency of the energy is substantially higher or lower than the frequency needed to cause electrons in the material to vibrate. As a result, the object is transparent to the light wave 34 because the light wave 34 merely passes through the material unchanged.

Accordingly, the transparent pane 14 is typically comprised of electrons having vibration frequencies sufficiently higher than the frequency of energy in the light waves 34. Thus, the light waves 34 are merely transmitted through the transparent pane 14 with nearly none of its energy being absorbed by the transparent pane 14.

Thereafter, the light waves 34 hit the heatable plate 12 and cause atoms therein to vibrate so as to generate heat therein. As is known by one skilled in the art, the electrons capture the energy of the light waves 34 if the vibration frequency of the electrons is approximately equal to the frequency of the energy in the light waves 34. If the frequencies are approximately equal, then the absorption of energy causes the electrons of the material to vibrate thereby causing the corresponding atoms to vibrate and collide with each other more frequently. As a result, heat is generated within the material.

The heatable plate 12 is typically composed of electrons having vibration frequencies approximately equal to the frequency of the energy in light waves 34 illuminating the plate 12. Thus, the plate 12 absorbs the energy of the light waves 34 for generating heat therein.

The heatable plate 12 preferably has a black coloring to optimize the amount of heat generated from the light waves 34. A black-colored object typically has electrons therein that are excited by more frequencies than most other colors. Therefore, the electrons and the atoms of the black-colored objects typically absorb the greatest amount of energy from the light waves 34 and produce the most significant amount of heat. Alternatively, the heatable plate may be white and the fluid may be black.

In the warming position, the heatable plate 12 constantly absorbs energy from the light waves 34 as long as the light waves 34 illuminate the heatable plate 12. Consequently, the heatable plate 12 continuously produces heat while the light waves 34 are hitting the plate 12.

An insulating medium 30 is disposed a base surface area 36 and the heatable plate 12 when the heatable plate 12 is in the warming position. As a result, the light waves 34 freely transmit through the transparent pane 14 directly to the plate 12. The insulating medium 30 is discussed in further detail in the description for FIG. 3B.

Referring now to FIG. 3B, there is illustrated a cross-sectional view of a cell 28 within the thermal panel 10 shown FIG. 1B, taken along line 3B—3B. The heatable plate 12 discontinues absorbing energy from the light waves 34 when the plate temperature exceeds a maximum threshold temperature. For instance, a thermal panel 10 for a roof of a building may discontinue producing heat as the plate temperature exceeds 100 degrees Fahrenheit. Of course, the maximum threshold temperature may vary depending upon the application of the thermal panel 10.

In general, a plate temperature exceeding the maximum temperature threshold causes the plate 12 to move from the warming position to a cooling position. In this regard, the plate 12 moves from the warming recess 20 where it can absorb energy from incoming light waves 34 to the cooling recess 26 where the insulating medium 30 blocks the light waves 34 from illuminating the plate 12.

In the preferred embodiment, the heatable plate 12 changes its shape and position depending on its plate temperature. The heatable plate 12 preferably is a metal disc composed of two different metals each having different coefficients of thermal expansion. It is known in the art that a bi-metal disc changes in shape and size relative to its temperature.

Accordingly, the heatable plate 12 preferably maintains a concave shape when its plate temperature is below the maximum temperature threshold. Further, the heatable plate 12 bows into a convex shape when its plate temperature meets or exceeds the maximum temperature threshold. The plate 12 then returns to its concave shape if the plate temperature falls below a minimum temperature threshold.

Thus, in the preferred embodiment, the concave shape of the plate 12 allows the plate 12 to abut against the concave transparent surface area 32 and receive energy from incoming light waves 34. Once the temperature of the heatable plate 12 meets or exceeds the maximum threshold temperature, the heatable plate 12 changes to a convex shape thereby passively moving from the warming position to the cooling position. As a result, the heatable plate 12 passively disposes itself to the cooling recess 26 where it abuts against the convex base surface area 36. Of course, the heatable plate 12 may be a variety of other kinds of bi-metal switches having suitable thermal expansion properties. Also, the plate 12, transparent surface area 32, and base surface area 36 may be shaped otherwise as desired.

As the heatable plate 12 moves from the warming position to the cooling position, the insulating medium 30 preferably weeps around an edge portion 12' of the heatable plate 12 into the warming recess 20. Consequently, the insulating medium 30 is disposed between the transparent surface area 32 and the heatable plate 12 so as to block incoming light waves 34 from illuminating the plate 12.

As best shown in FIG. 1A, the preferred embodiment requires the heatable plate 12 to be a generally circular disc and an equator portion 28' of the cell 28 to be hexagonal in form. The edge portion 12' of the circular plate 12 contacts the equator portion 28' of the cell 28. Further, the edge portion 12' of the plate 12 and the corners of the equator portion 28' have at least one gap 38 therebetween. As the heatable plate 12 moves from the warming recess 20 to the cooling recess 26, the insulating medium 30 passively flows through the gaps 38 toward the transparent surface area 32.

Figure 4A:
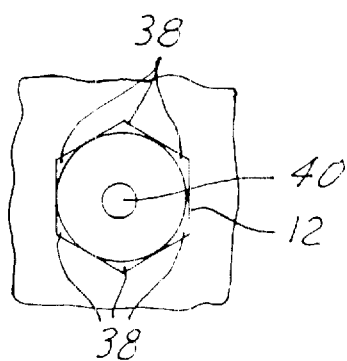
FIG. 4A is a cutaway view of a thermal panel illustrating a cell according to a first alternative embodiment of the present invention.
Figure 4B:
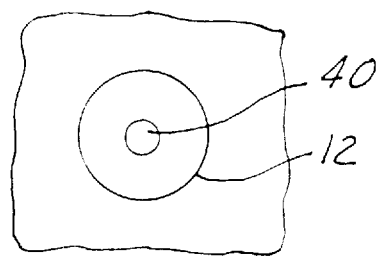
FIG. 4B is a cutaway view of a thermal panel illustrating a cell according to a second alternative embodiment of the present invention.

FIGS. 4A and 4B show alternate embodiments of the cell 28 for providing an alternate flow paths for the insulating medium 30. A heatable plate 12 has at least one hole 40 integrally formed therein for allowing the insulating medium 30 to weep therethrough. In this regard, the insulating medium 30 has a more direct path to the warming recess 20. Moreover, the hole 40 may provide a path of low resistance for the flow of the insulating medium 30. Thus, the equator portion 28' may also be circular in form similar to the general shape of the plate 12. Naturally, the equator portion 28' may remain hexagonal for providing multiple flow paths for the insulating medium 30. The hole 40 may be formed within the center of the plate 12 for permitting the efficient flow of the medium 30. However, the hole 40 may be formed within other areas of the plate 12 as desired. Likewise, the equator portion 28' may be hexagonal, circular, or otherwise to provide more or less gaps between the edge portion 12' of the plate and the equator portion 28'.

Turning back to FIG. 3B, the insulating medium 30 is located between the transparent surface area 32 and the heatable plate 12 when the heatable plate 12 is in the cooling position. The insulating medium 30 reflects the energy of the incoming light waves 34 thereby preventing the light waves 34 from hitting the heatable plate 12 and generating heat therein. The insulating medium 30 preferably has a reflective white coloring for reflecting the incoming light waves 34. In particular, the insulating medium 30 preferably contains titanium oxide for increasing the reflective capability of the insulating medium 30.

As is known in the art, a reflective white coloring of the medium 30 may permit electrons therein to absorb energy yet prevent the electrons from transferring the energy to the atoms for generating heat. The energized electrons merely vibrate and then send the energy back out of the medium 30 as a reflected light wave 42.

The heatable plate 12 remains in the cooling position until a minimum temperature threshold is attained. If the plate temperature meets or falls below the minimum temperature threshold, the plate 12 returns to the warming position to receive energy from incoming light waves 34 for producing heat. The plate 12 preferably is a bi-metal disc that reacts to the decreased temperature so as to passively dispose itself to the warming position in a similar manner as it disposes itself to the cooling position. Once the plate 12 is in the warming position, the plate 12 absorbs energy from the light waves 34 to produce heat as described above.

FIG. 5 is a flowchart depicting a method of passive temperature control according to a preferred embodiment of the present invention. The sequence is commenced at step 50 and then immediately proceeds to step 52.

In step 52, a heatable plate 12 is provided for receiving energy from light waves 34 for producing heat. Preferably, there is provided a heatable plate 12 as integrated within the thermal panel 10 detailed in the descriptions for FIGS. 1A–4B. However, various other suitable heatable plates 12 may be employed. The sequence then proceeds to step 54.

In step 54, it is determined whether a plate temperature of the heatable plate 12 is greater than a maximum temperature threshold. The maximum temperature threshold most likely depends upon the intended application of the passive temperature control. For example, passive temperature control for a building roof may require a maximum temperature threshold of 100 degrees Fahrenheit.

If the plate temperature is not greater than the maximum temperature threshold, then the sequence immediately proceeds to step 58.

If, however, in step 54 the temperature is greater than a maximum temperature threshold, then the sequence proceeds to step 56.

In step 56, the heatable plate 12 is passively disposed to a cooling position for insulation from light waves 34. Preferably, the passive movement of the plate 12 is due in part to the plate 12 being composed of two metals, with one of the metals having a greater coefficient of thermal expansion than the other. Consequently, the plate 12 changes in shape and size because of the effect of the increased temperature on the bi-metal plate 12. This change in shape and size causes the heatable plate 12 to move from the warming position to the cooling position. Nonetheless, a variety of other mechanisms may be employed to passively move the heatable plate 12 from the warming position to the cooling position.

In the cooling position, the heatable plate 12 is shielded from the light waves 34. The preferred embodiment requires an insulating medium 30 to shield the heatable plate 12 from light waves 34. As the heatable plate changes its shape and size in order to move to the cooling position, the insulating medium 30 passively flows around the plate to a space between the plate 12 and the source of the light waves 34. This step may be accomplished by manipulating the insulating medium as detailed in the descriptions for FIGS. 1A, 4A, and 4B. Thereafter, the insulating medium 30 reflects the light waves 34 away from the plate 12. Of course, the heatable plate may be insulated from light waves by other suitable mechanisms. Then, the sequence proceeds to step 58.

In step 58, it is determined whether the plate temperature is less than the minimum temperature threshold. If the plate temperature is not less than the minimum temperature threshold, then the sequence returns to step 54 to repeat the cycle of operation.

If, however, in step 58 the plate temperature is less than a minimum temperature threshold, then the sequence continues to step 60. In step 60, the heatable plate 12 is passively disposed to the warming position in order to receive light waves for generating heat. This step is preferably accomplished by employing a plate 12 that is a bi-metal disc having two metals of different coefficients of thermal expansion, as described above. Accordingly, the plate 12 changes in shape and size because of the effect of the increased temperature on the bi-metal plate 12. This change in shape and size causes the heatable plate 12 to move from the cooling position to the warming position. Also, numerous other mechanisms may be used to passively move the heatable plate 12 from the cooling position to the warming position.

In the warming position, the heatable plate 12 receives the light waves 34 so as to produce heat. Preferably, the plate has a black coloring for the purpose of most efficiently transforming the energy from the light waves 34 to heat. However, alternative mechanisms may be used for generating heat using the light waves 34 illuminating the plate 12. At this point, one full cycle of a preferred operation is complete and the sequence returns to step 54.

While particular embodiments of the present invention have been shown and described, numerous variations and alternate embodiments will occur to those skilled in the art. Accordingly, it is intended that the invention be limited only in terms of the appended claims.

What is claimed is:

1. A thermal panel comprising:

a cell having a transparent side and a base side;

a heatable plate contained within said cell, said heatable plate being passively disposable between a warming position and a cooling position, said heatable plate receiving a light wave for producing heat when said heatable plate is in said warming position; and an insulating medium contained within said cell, said insulating medium shielding said heatable plate from said light wave when said heatable plate is in said cooling position.

2. The thermal panel as recited in claim 1 wherein said heatable plate is a bi-metal disc having a first metal and a second metal therein, said first metal having a first thermal expansion coefficient and said second metal having a second thermal expansion coefficient greater than said first thermal expansion coefficient.

3. The thermal panel as recited in claim 1 wherein said heatable plate has a black coloring, said black coloring receiving said light wave and passively transforming said light wave into heat.

4. The thermal panel as recited in claim 1 wherein said insulating medium is a reflective white fluid, said reflective white fluid reflecting said light wave.

5. The thermal panel as recited in claim 1 wherein said heatable plate is passively disposed in said warming position when a plate temperature of said heatable plate is below a minimum threshold temperature.

6. The thermal panel as recited in claim 1 wherein said heatable plate is passively disposed in said cooling position when a plate temperature of said heatable plate is above a maximum threshold temperature.

7. The thermal panel as recited in claim 1 wherein said cell has an equator portion and said heatable plate has an edge portion in contact with said equator portion, said edge portion and said equator portion having at least one gap therebetween for permitting a flow of said insulating medium therethrough.

8. The thermal panel as recited in claim 1 wherein said heatable plate has at least one hole formed therein for permitting a flow of said insulating medium therethrough.

9. A thermal panel comprising:

a transparent pane having a first side and a second side, said second side having at least one warming recess formed therein, said transparent pane permitting a light wave to pass therethrough;

a base pane having a mating surface, said mating surface coupled to said second side of said transparent pane, said mating surface having at least one cooling recess formed therein, said at least one cooling recess being coupled to said at least one warming recess to form at least one cell;

at least one heatable plate contained within said at least one cell, said at least one heatable plate being passively disposable between a warming position and a cooling position, said at least one heatable plate receiving said light wave for producing heat when said heatable plate is in said warming position; and an insulating medium contained within said cell, said insulating medium shielding said at least one heatable plate from said light wave when said at least one heatable plate is in said cooling position.

10. The thermal panel as recited in claim 9 wherein said at least one heatable plate is at least one bi-metal disc having a first metal and a second metal, said first metal having a first thermal expansion coefficient and said second metal having a second thermal expansion coefficient greater than said first thermal expansion coefficient.

11. The thermal panel as recited in claim 9 wherein said at least one heatable plate has a black coloring, said black coloring receiving said light wave and passively generating heat from an energy of said light wave.

12. The thermal panel as recited in claim 9 wherein said insulating medium is a reflective white fluid, said reflective white fluid reflecting said light wave.

13. The thermal panel as recited in claim 9 wherein said at least one heatable plate is passively disposed in said warming position when said plate temperature is below a minimum threshold temperature.

14. The thermal panel as recited in claim 9 wherein said at least one heatable plate is passively disposed in said cooling position when said plate temperature is above a maximum threshold temperature.

15. The thermal panel as recited in claim 9 wherein said cell has an equator portion and said at heatable plate has an edge portion in contact with said equator portion, said edge portion and said equator portion having at least one gap therebetween for permitting a flow of said insulating medium therethrough.

16. The thermal panel as recited in claim 9 wherein said heatable plate has at least one hole formed therein for permitting a flow of said insulating medium therethrough.

17. A passive temperature control method comprising the steps of:

providing at least one heatable plate;

heating said at least one heatable plate when said at least one heatable plate is in a warming position;

passively disposing said at least one heatable plate to a cooling position when a plate temperature of said at least one heatable plate is above a maximum threshold temperature;

insulating said at least one heatable plate when said at least one heatable plate is in said cooling position; and passively disposing said at least one heatable plate to said warming position when a plate temperature of said at least one heatable plate is below a minimum threshold temperature.

18. The passive temperature control method as recited in claim 17 wherein the step of heating said at least one heatable plate comprises illuminating said at least one heatable plate with a light wave.

19. The passive temperature control method as recited in claim 18 wherein the step of insulating said at least one heatable plate comprises shielding said light wave from said at least one heatable plate.

20. The passive temperature control method panel as recited in claim 17 wherein said at least one heatable plate is at least one bi-metal disc having a first metal and a second metal, said first metal having a first thermal expansion coefficient and said second metal having a second thermal expansion coefficient greater than said first thermal expansion coefficient.

* * * * *